United States Patent
Choo et al.

(10) Patent No.: US 8,542,479 B2
(45) Date of Patent: Sep. 24, 2013

(54) MOBILE TERMINAL

(75) Inventors: Zhi Min Choo, Anyang-si (KR); Young In Park, Suwon-si (KR)

(73) Assignee: LG Electronics Inc., Seoul (KR)

( * ) Notice: Subject to any disclaimer, the term of this patent is extended or adjusted under 35 U.S.C. 154(b) by 221 days.

(21) Appl. No.: 13/007,476

(22) Filed: Jan. 14, 2011

(65) Prior Publication Data

US 2012/0039028 A1 Feb. 16, 2012

(30) Foreign Application Priority Data

Aug. 12, 2010 (KR) .................. 10-2010-0077708

(51) Int. Cl.
*H05K 5/00* (2006.01)

(52) U.S. Cl.
USPC ............. 361/679.01; 361/679.3; 361/679.44; 361/679.02; 361/679.56

(58) Field of Classification Search
USPC 455/575.4, 575.3, 550.1, 575.1; 361/679.01, 361/679.02, 679.03, 679.44, 679.56
See application file for complete search history.

(56) References Cited

U.S. PATENT DOCUMENTS 8,099,144 B2 * 1/2012 Rubin et al. ............... 455/575.4
2007/0243896 A1 10/2007 Maatta et al.
2008/0307607 A1 12/2008 Kim et al.

FOREIGN PATENT DOCUMENTS

EP 2 175 619 A1 4/2010

* cited by examiner

*Primary Examiner* — Tuan T Dinh
*Assistant Examiner* — Hung Dang
(74) *Attorney, Agent, or Firm* — Birch, Stewart, Kolasch & Birch, LLP

(57) ABSTRACT

A mobile terminal of a slide type having a dual display is disclosed, by which if an open configuration has been entered after sequential completion of slidable and rotary movements, two displays are located on the same plane in an open configuration to provide various user interface environments. The present invention includes a first body, a second body slidably connected to the first body, and a slide hinge module configured to guide a slidable movement of the second body on the first body to open the first body, the slide hinge module configured to guide a rotary movement of the second body against the first body in case of an open configuration of a partial region of the first body.

18 Claims, 16 Drawing Sheets

FIG. 4
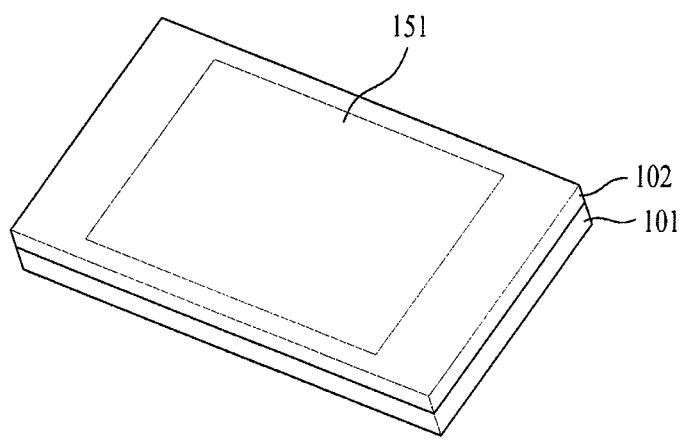
(a)
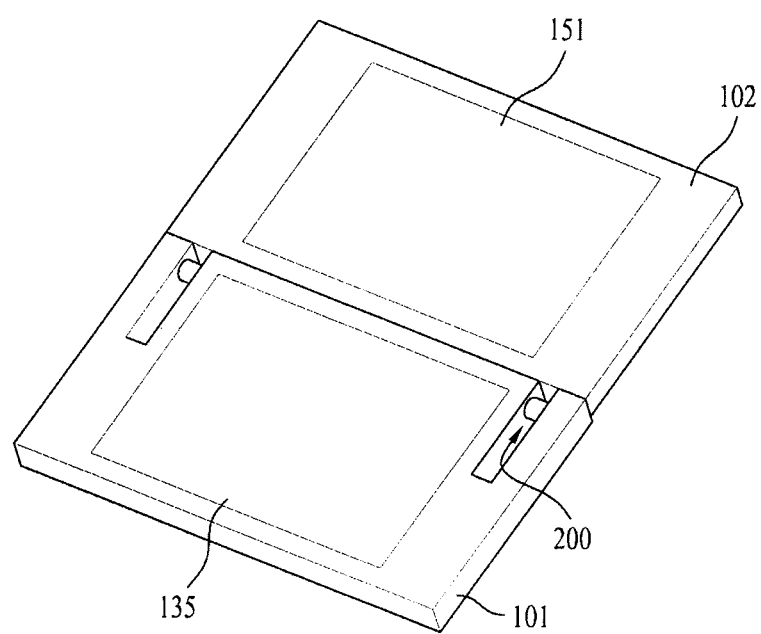
(b)

FIG. 7
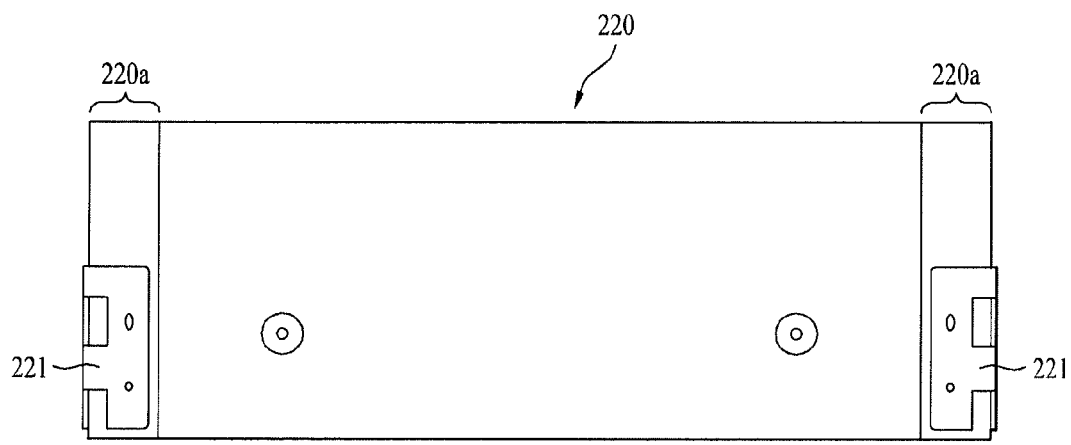
(a)
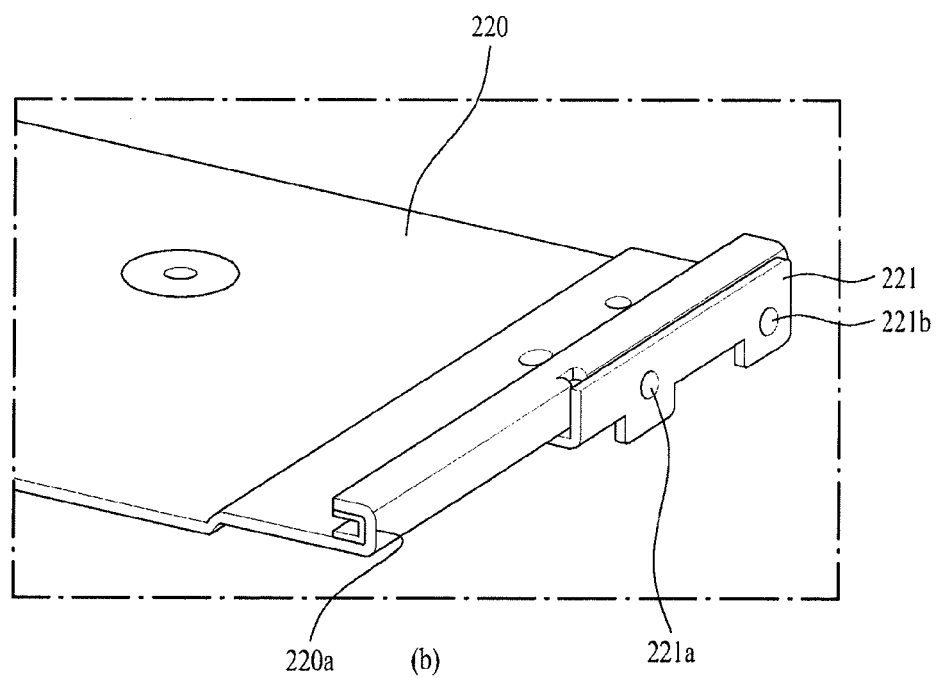
(b)

MOBILE TERMINAL

This application claims the benefit of the Korean Patent Application No. 10-2010-0077708, filed on Aug. 12, 2010, which is hereby incorporated by reference as if fully set forth herein.

BACKGROUND OF THE INVENTION

1. Field of the Invention

The present invention relates to a mobile terminal, and more particularly, to a mobile terminal of a slide type having a dual display.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mounted terminals according to availability for hand-carry.

There are ongoing efforts to support and increase the functionality of mobile terminals. Such efforts include software and hardware improvements, as well as changes and improvements in the structural components which form the mobile terminal.

SUMMARY OF THE INVENTION

Accordingly, the present invention is directed to a mobile terminal that substantially obviates one or more problems due to limitations and disadvantages of the related art.

An object of the present invention is to provide a mobile terminal, by which an open configuration can be obtained after sequential completion of slidable and rotary movements.

Another object of the present invention is to provide a mobile terminal, by which two displays are located on the same plane in an open configuration.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a first body, a second body slidably connected to the first body, and a slide hinge module configured to guide a slidable movement of the second body on the first body to open the first body and configured to guide a rotary movement of the second body against the first body in case of an open configuration of a partial region of the first body.

Preferably, the slide hinge module includes a fixing part provided within the second body, a slide part to slide along the fixing part, and a pair of hinge arms having a first end portion rotatably provided to the slide part and a second end portion rotatably provided within the first body.

More preferably, a pair of the hinge arms include a first hinge arm configured to provide a turning force to the fixing part and a second hinge arm configured to guide a rotary movement of the fixing part.

In this case, the first hinge arm is provided with an elastic member to apply the turning force to a hinge shaft provided to the second end portion in a slide movement direction of the second body. And, the elastic member includes a torsion spring.

More preferably, the fixing part is provided with a guide groove for guiding a slide movement of the second body in a manner of pressurizing the first end portion of each of the hinge arms toward the first body.

In this case, the guide groove is provided with a recess for releasing a binding force to the first end portion of the second hinge arm if a partial region of the first body is in an open configuration. And, the recess is provided to a location at which the slide movement of the second body is completed to open the first body.

In this case, the recess is projected toward a depth direction of the guide groove from a bottom surface of the guide groove.

In this case, the first end portion of the second hinge arm is engaged with an inner circumference of the recess.

More preferably, both lateral end portions of the fixing part are enclosed by the slide part and a pair of the hinge arms are loaded on both of lateral end portions of the slide part to correspond to each lateral end portion of the fixing part, respectively In this case, the second end portions of the second hinge arms loaded on both of the lateral end portions of the slide part are connected to each other via a connecting rod and an actuator configured to provide the turning force to the second hinge arm is loaded on the connecting rod.

Moreover, the first hinge arm and the second hinge arm are bent in directions opposite to each other in a closed configuration of the first body.

Preferably, a first display is provided to the first body to be externally exposed in a slide open process and a second display is provided to the second body to be externally exposed. Moreover, after a rotary movement of the second body has been completed against the first body, the first display and the second display form a same plane.

Preferably, a keypad is provided to the first body to be externally exposed in a slide open process and a display is provided to the second body to be externally exposed. Moreover, after a rotary movement of the second body has been completed against the first body, the keypad and the display form a same plane.

In another aspect of the present invention, a mobile includes a main body provided with a first display, a slide body slidably provided to the main body to expose the first display, the slide body provided with an second display, and a slide hinge module configured to guide a slide movement of the slide body to reduce an overlapped region between the main body and the slide body, the slide hinge module configured to guide a rotary movement of the slide body to prevent the main body and the slide body from being overlapped with each other.

Preferably, after the slide movement of the slide body has been completed, the rotary movement of the slide body starts.

More preferably, after the slide movement of the slide body has been completed, the first display and the second display form a same plane.

Preferably, the slide hinge module includes a fixing part provided within the slide body, a slide part configured to slidably move along the fixing part, and a pair of hinge arms having a first end portion rotatably provided to the slide part and a second end portion rotatably provided within the main body.

More preferably, a pair of the hinge arms include a first hinge arm configured to provide a turning force to the fixing part and a second hinge arm configured to guide a rotary movement of the fixing part.

Accordingly, the present invention provides the following effects and/or advantages.

First of all, if an open configuration has been entered after sequential completion of slidable and rotary movements, two displays are located on the same plane in an open configuration.

Secondly, the present invention provides various user interface environments.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 4a and 4b are perspective diagrams for closed and open configurations of a mobile terminal according to one embodiment of the present invention;

FIGS. 7a and FIG. 7b are diagrams of a sliding part shown in FIG. 5;

FIGS. 10 to 14a-d are diagrams for an open configuration of a mobile terminal according to one embodiment of the present invention.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
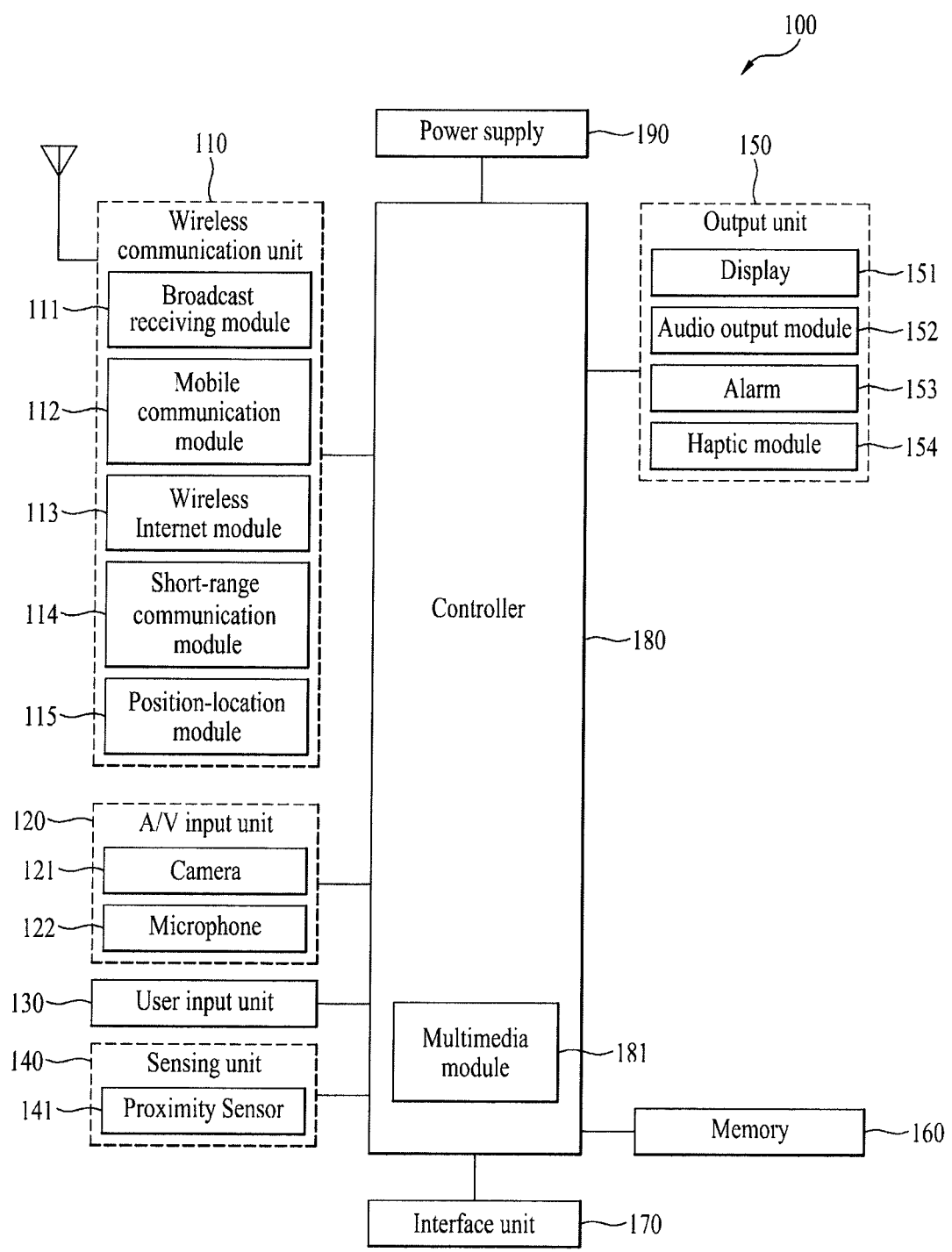
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components which permit wireless communication between the mobile terminal 100 and a wireless communication system or network within which the mobile terminal is located. In case of non-mobile terminals, the wireless communication unit 110 can be replaced with a wire communication unit. The wireless communication unit 110 and wire communication unit can be commonly referred to as a communication unit.

A broadcast receiving module 111 receives a broadcast signal and/or broadcast associated information from an external broadcast managing entity via a broadcast channel. The broadcast channel may include a satellite channel and a terrestrial channel. The broadcast managing entity generally refers to a system which transmits a broadcast signal and/or broadcast associated information.

At least two broadcast receiving modules 111 can be provided to the mobile terminal 100 in pursuit of simultaneous receptions of at least two broadcast channels or broadcast channel switching facilitation.

Examples of broadcast associated information include information associated with a broadcast channel, a broadcast program, a broadcast service provider, etc. For example, the broadcast associated information may include an electronic program guide (EPG) of digital multimedia broadcasting (DMB) and an electronic service guide (ESG) of digital video broadcast-handheld(DVB-H).

The broadcast signal may be implemented, for example, as a TV broadcast signal, a radio broadcast signal, and a data broadcast signal. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. If desired, data received by the broadcast receiving module 111 may be stored in a suitable device, such as a memory 160.

A mobile communication module 112 communicates wireless signals with one or more network entities such as a base station or Node-B. Such signals may represent, for example, audio, video, multimedia, control signaling, and data.

A wireless internet module 113 supports Internet access for the mobile terminal 100. This module may be internally or externally coupled to the mobile terminal 100. Suitable technologies for wireless internet may include, but are not limited to, WLAN (Wireless LAN)(Wi-Fi), Wibro (Wireless broadband), Wimax (World Interoperability for Microwave Access), and HSDPA(High Speed Downlink Packet Access). The wireless internet module can be replaced with a wire internet module in non-mobile terminals. The wireless internet module 113 and wire internet module may be commonly referred to as an internet module.

A short-range communication module 114 facilitates relatively short-range communications. Suitable technologies for short-range communication my include, but are not limited to, radio frequency identification (RFID), infrared data association (IrDA), ultra-wideband (UWB), as well as the networking technologies commonly referred to as Bluetooth and ZigBee.

A position-location module 115 identifies or otherwise obtains the location of the mobile terminal 100. This module may be implemented using, for example, global positioning system (GPS) components which cooperate with associated satellites, network components, and combinations thereof.

According to the current technology, the GPS module 115 is able to precisely calculate current 3-dimensional position information based on longitude, latitude and altitude by calculating distance information and precise time information from at least three satellites and then applying triangulation to the calculated information. Currently, location and time information are calculated using three satellites, and errors of the calculated location position and time information are then amended using another satellite. Besides, the GPS module 115 is able to calculate speed information by continuously calculating a real-time current location.

An audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video.

A microphone 122 receives an external audio signal while the portable device is in a particular mode, such as phone call mode, recording mode or voice recognition mode. This audio signal is processed and converted into digital data.

The portable device, and specifically the A/V input unit 120, typically includes assorted noise removing algorithms to remove noise generated in the course of receiving the external audio signal. Data generated by the A/V input unit 120 may be stored in the memory 160, utilized by the output unit 150, or transmitted via one or more modules of communication unit 110. If desired, two or more microphones and/or cameras may be used.

A user input unit 130 generates input data responsive to user manipulation of an associated input device or devices. Examples of such devices include a keypad, a dome switch, a touchpad such as static pressure/capacitance, a jog wheel and a jog switch. A specific example is one in which the user input unit 130 is configured as a touchpad in cooperation with a display, which will be described in more detail below.

A sensing unit 140 provides status measurements of various aspects of the mobile terminal 100. For example, the sensing unit may detect an open/close status of the mobile terminal 100, relative positioning of components such as a display and keypad of the mobile terminal, a change of position of the mobile terminal or a component of the mobile terminal, a presence or absence of user contact with the mobile terminal, orientation or acceleration/deceleration of the mobile terminal.

If the mobile terminal 100 is configured as a slide-type mobile terminal, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

An interface unit 170 is often implemented to couple the mobile terminal with external devices. Typical external devices include wired/wireless headphones, external chargers, power supplies, storage devices configured to store data such as audio, video, and pictures, as well as earphones and microphones. The interface unit 170 may be configured using a wired/wireless data port, audio input/output ports, video input/output port, a card socket for coupling to a memory card, a subscriber identity module (SIM) card, a user identity module (UIM) card, or removable user identity module (RUIM) card).

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

An output unit 150 generally includes various components that support the output requirements of the mobile terminal 100. A display 151 is typically implemented to visually display information associated with the mobile terminal 100. For example, if the mobile terminal 100 is operating in a phone call mode, the display will generally provide a user interface or graphical user interface that includes information associated with placing, conducting, and terminating a phone call. As another example, if the mobile terminal 100 is in a video call mode or a photographing mode, the display 151 may additionally or alternatively display images associated with these modes.

One particular implementation includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display.

Some of the above displays can be configured transparent so that an external environment can be seen through the corresponding display. Such a display can be called a transparent display. As a representative example for the transparent display, there is a transparent LCD display or the like.

The mobile terminal 100 may include one or more of displays 151. An example of a two-display embodiment is one in which one display 151 is configured as an internal display viewable when the terminal is in an opened position and a second display 151 configured as an external display viewable in both the open and closed positions.

The touchscreen can be configured to detect a touch input pressure as well as a touch input position and size.

Meanwhile, a proximity sensor 141 can be provided within or around the touchscreen. The proximity sensor detects an object approaching a prescribed detecting surface or a presence or non-presence of an object existing around itself using an electromagnetic power or infrared rays without mechanical contact. Hence, the proximity sensor is superior to a contact sensor in lifespan and utilization.

Example for an operational principle of the proximity sensor is explained as follows. First of all, if an object approaches a sensor detecting surface while an oscillation circuit oscillates a sine radio frequency, an oscillation amplitude of the oscillation circuit attenuates or stops. This change is converted to an electric signal to detect a presence or non-presence of the object. So, even if any material except a metallic comes between the RF oscillation proximity sensor and the object, a proximity switch is able to detect the object to detect without interference with the material.

In spite of not providing the proximity sensor, if the touchscreen is electrostatic, it can be configured to detect the proximity of a pointer through an electric field change attributed to the proximity of the pointer.

So, in case that the pointer is placed in the vicinity of the touchscreen without being actually contacted with the touchscreen, it is able to detect a position of the pointer and a distance between the pointer and the touchscreen. For clarity and convenience of explanation, an action for enabling the pointer approaching the touchscreen to be recognized as placed on the touchscreen is named 'proximity touch' and an action of enabling the pointer to actually come into contact with the touchscreen is named 'contact touch'. And, a position, at which the proximity touch is made to the touchscreen using the pointer, means a position of the pointer vertically corresponding to the touchscreen when the pointer makes the proximity touch.

If the proximity sensor is used, it is able to sense a proximity touch and its pattern (e.g., proximity touch distance, proximity touch direction, proximity touch speed, proximity touch position, proximity touch moving state, etc.). And, it is also able to output information corresponding to the sensed proximity touch action and the proximity touch pattern to the touchscreen.

FIG. 1 further shows the output unit 150 having an audio output module 152 which supports the audio output requirements of the mobile terminal 100. The audio output module 152 is often implemented using one or more speakers, buzzers, other audio producing devices, and combinations thereof.

The audio output module 152 functions in various modes such as call-receiving mode, call-placing mode, recording mode, voice recognition mode and broadcast reception mode. During operation, the audio output module 152 outputs audio relating to a particular function or status, such as call received, message received, or errors.

The output unit 150 is further shown having an alarm 153, which is commonly used to signal or otherwise identify the occurrence of a particular event associated with the mobile terminal 100. Typical events include call received, message received and user input received.

An example of a signal provided by the output unit 150 is tactile sensations. For example, the alarm 153 may be configured to vibrate responsive to the mobile terminal 100 receiving a call or message. As another example, vibration is provided by the alarm 153 responsive to receiving user input at the mobile terminal 100, thereby providing a tactile feedback mechanism. It is understood that the various signals provided by the components of output unit 150 may be separately performed or performed using any combination of such components.

A memory 160 is generally used to store various types of data to support the processing, control, and storage requirements of the mobile terminal 100. Examples of such data include program instructions for applications operating on the mobile terminal 100, contact data, phonebook data, messages, pictures, and video.

Moreover, data for various patterns of vibration and/or sound outputted in case of a touch input to the touchscreen can be stored in the memory 160.

As map information can be stored in the memory 160, user's convenience can be further provided in a manner of providing the map information to a user if necessary. Moreover, a recent use history or a cumulative use frequency of each menu in the mobile terminal can be stored in the memory 160.

The memory 160 shown in FIG. 1 may be implemented using any type or combination of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

A controller 180 typically controls the overall operations of the mobile terminal 100. For example, the controller 180 performs the control and processing associated with voice calls, data communications, instant message communication, video calls, camera operations and recording operations.

The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

A power supply 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments may also be implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

The mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal 100. However such teachings apply equally to other types of mobile terminals.

Figure 2:
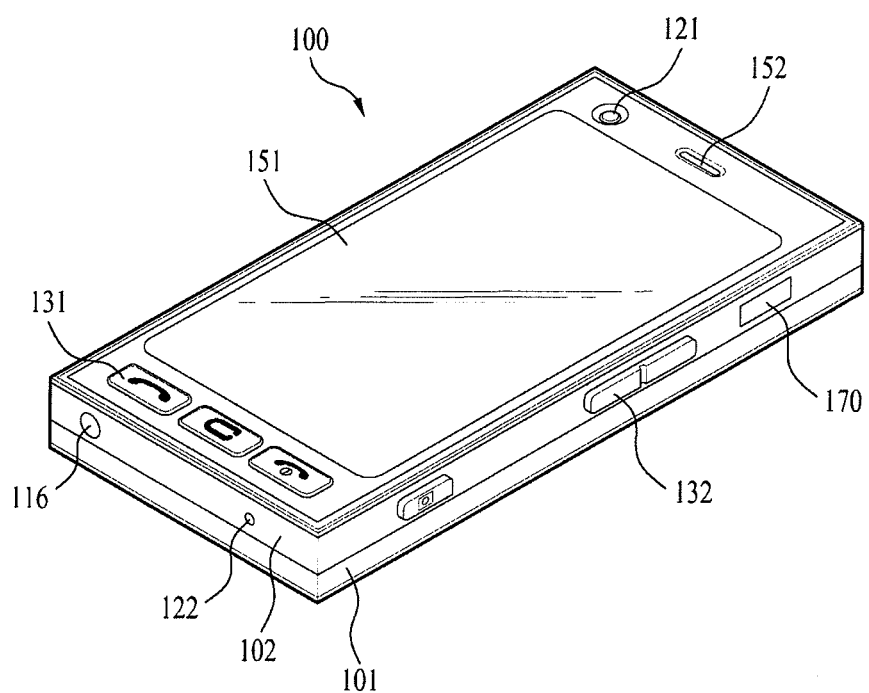
FIG. 2 is a front perspective diagram of a mobile terminal according to one embodiment of the present invention.

FIG. 2 is a front perspective diagram for an example of a mobile terminal according to the present invention.

Referring to FIG. 2, a mobile terminal 100 according to the present invention includes a terminal body of a slide type, in which a pair of bodies are assembled in a manner that they can move relatively. And, the terminal body includes a first body 101 and a second body 102 configured to be slidable on the first body 101.

A closed configuration may indicate a state that the first body 101 is superposed onto the second body 102. And, an open configuration may indicate a state that the second body 102 slides to be positioned in a manner of exposing at least one portion of the first body 101.

In particular, the first and second bodies 101 and 102 include a case configuring an exterior of the mobile terminal 100. In this case, the case includes a casing, a housing, a cover and the like.

The case is formed by injection molding using synthetic resin or can be formed using metal substance such as stainless steel (STS), titanium (Ti) and the like.

In the second body 102, a second display 151, an audio output module 152, a camera 121, a user input unit 130, a microphone 122, an interface 170 and the like can be loaded.

The second display 151 occupies most of a major surface of the second body 102. The audio output module 152 and the camera 121 are provided to a region adjacent to one end portion of both end portions of the second display 151, while the a first manipulation unit 131 and the microphone 122 are provided to another region adjacent to the other end portion. A second manipulation unit 132, the interface 170 and the like can be provided to lateral sides of the front and rear cases 101 and 102 (i.e., the first body 101 and the second body 102).

The user input unit 130 is manipulated to receive an input of a command for controlling an operation of the mobile terminal 100 and is able to include the plurality of manipulating units 131 and 132.

The manipulating units 131 and 132 can have a common name called a manipulating portion and can adopt any system in a tactile manner enabling a user to perform manipulation with a tactile feel.

Contents inputted via the first manipulating unit 131 or the second manipulating unit 132 can be set in various ways. In particular, the first manipulating unit 131 is provided to input such a command as start, end, scroll and the like. And, the second manipulating unit 132 is able to receive an input such a command as a level adjustment of a sound outputted from the audio output unit 152, a switching to a touch recognizing mode of the second display 151 and the like.

Figure 3:
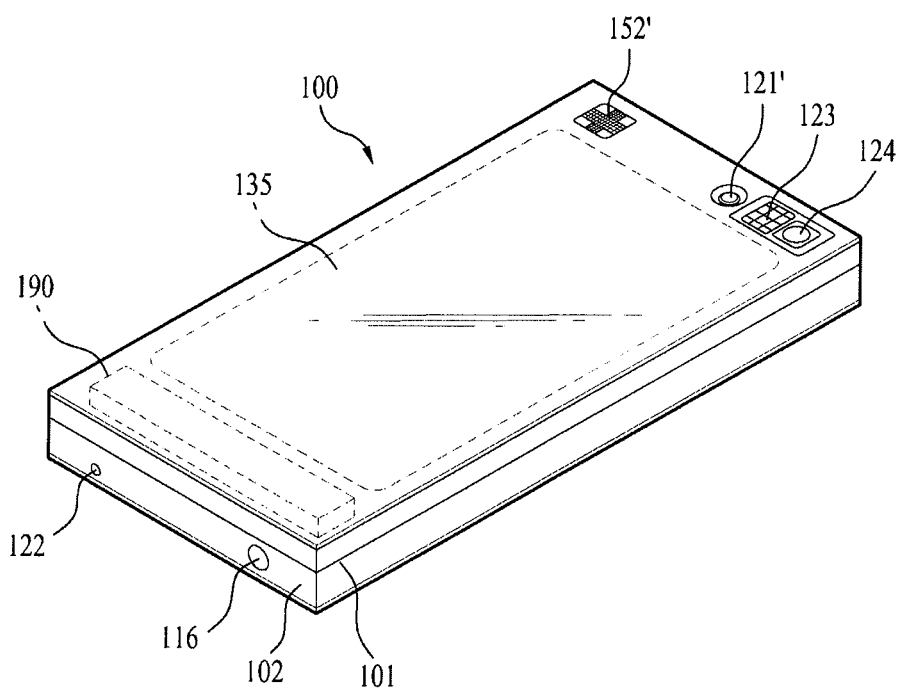
FIG. 3 is a rear perspective diagram of a mobile terminal according to one embodiment of the present invention.

FIG. 3 is a rear perspective diagram of the mobile terminal shown in FIG. 2.

Referring to FIG. 3, a camera 121' can be further provided to the first body 101. The camera 121' has a photographing direction substantially opposite to that of the former camera 121 (cf. FIG. 2) and can have pixels different from those of the former camera 121.

For instance, the former camera 121 provided to the second body 102 preferably has low pixels to have no difficulty in photographing a user's face to send in case of a video call or the like. Yet, the latter camera 121' provided to the first body 101 takes a picture of a general subject and usually does not directly send the taken picture. Hence, the latter camera 121' preferably has high pixels. Moreover, the cameras 121 and 121' can be provided to the second and first bodies in a manner of being rotatable or popped up, respectively.

Optionally, a flash 123 and a mirror 124 are provided adjacent to the camera 121'. When a subject is taken using the camera 121', the flash 123 projects light toward the subject. In case that a user attempts to take a picture of himself/herself using the camera 121' [self-photographing], the mirror 124 enables the user to see his/her face reflected on the mirror.

An audio output module 152' can be further provided to a backside of the first body 101.

The audio output module 152' is able to implement a stereo function together with the former audio output module 152 (cf. FIG. 2). And, the latter audio output module 152' is usable to implement a speakerphone mode for making a phone call.

A broadcast signal receiving antenna 124 for a call and the like can be provided to one side of each of the bodies 101 and 102. This antenna 124 can be installed retractable from the terminal body in a manner of configuring a portion of the broadcast receiving module 111 (cf. FIG. 1).

The power supply unit 190 can be provided to the first body 101 to supply power to the mobile terminal 100. The power supply unit 190 is built in the terminal body or can be externally provided detachable to the terminal body.

A first display 135 can be provided to the first body 101. And, the first display 135 can include a touchpad or a touchscreen to detect a touch.

The first display can be operated by being linked to the second display 151. The first display 135 can be provided in parallel with the second display 151 in rear or front of the second display 151. The first display 135 can have a size equal to or smaller that the second display 151. Moreover, each of the first and second displays 135 and 151 can include a touchscreen possible for a touch input.

Figure 5:
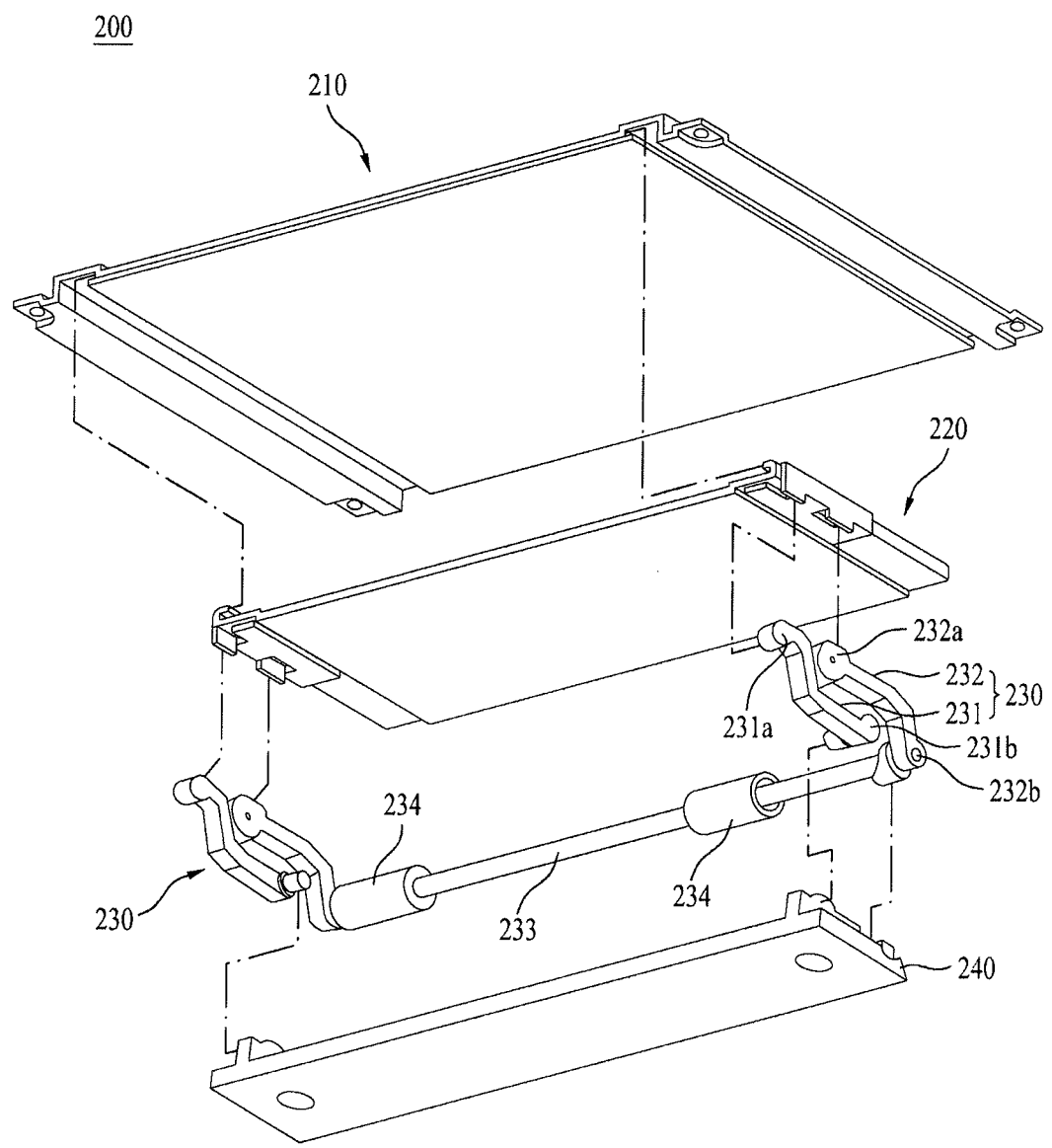
FIG. 5 is an exploded perspective diagram of a slide hinge module of a mobile terminal according to one embodiment of the present invention.
Figure 6:
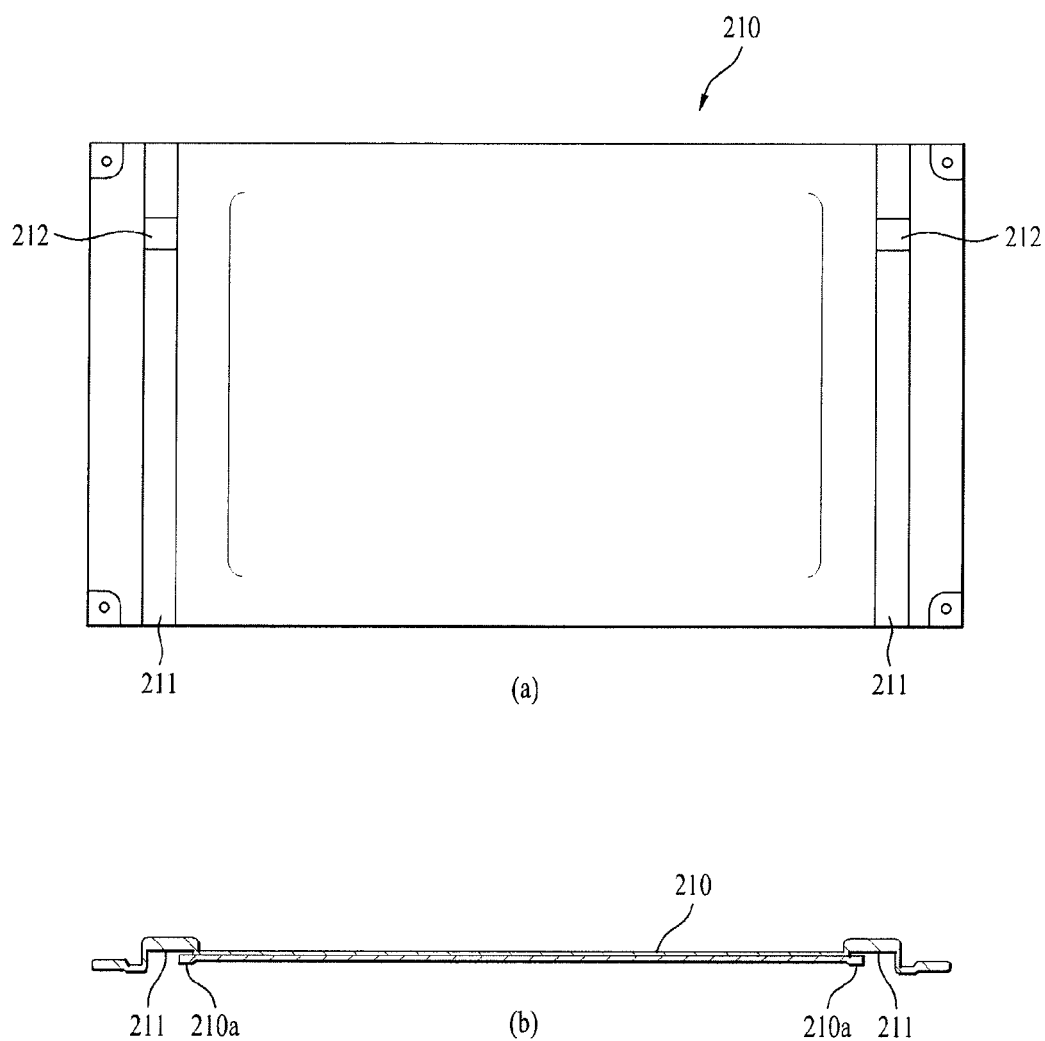
FIGS. 6a and FIG. 6b are diagrams of a fixing part shown in FIG. 5.
Figure 8:
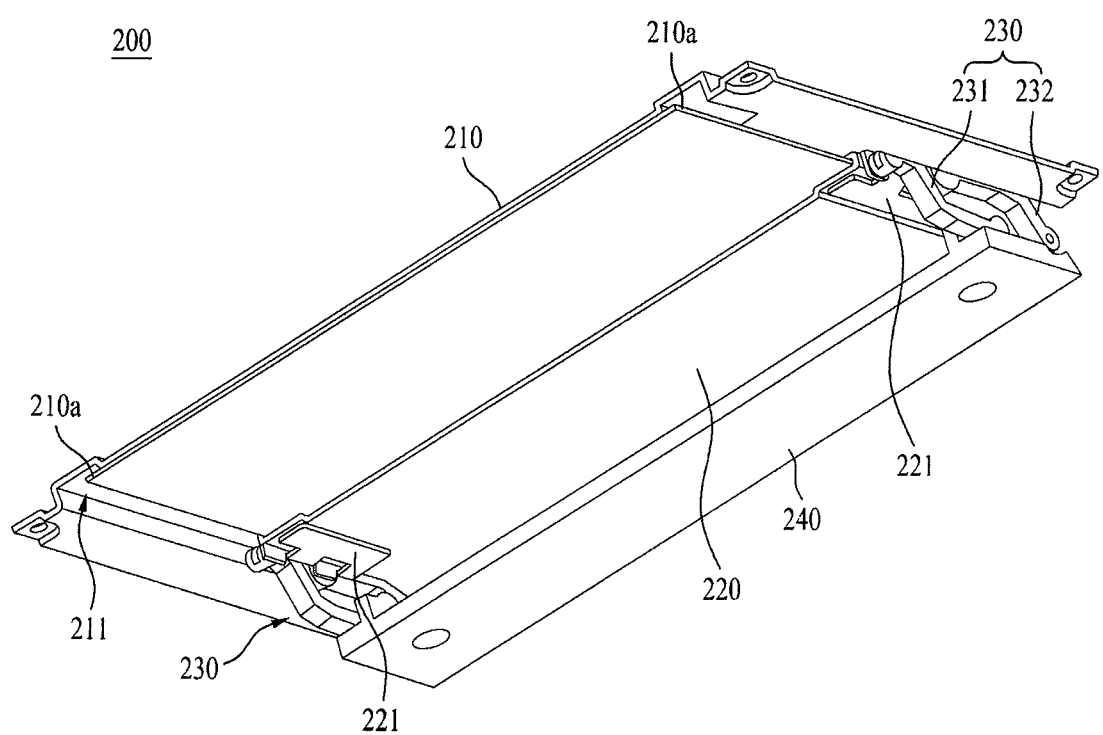
FIG. 8 and FIG. 9 are perspective diagrams of assembled configuration members shown in FIG. 5, respectively.
Figure 9:
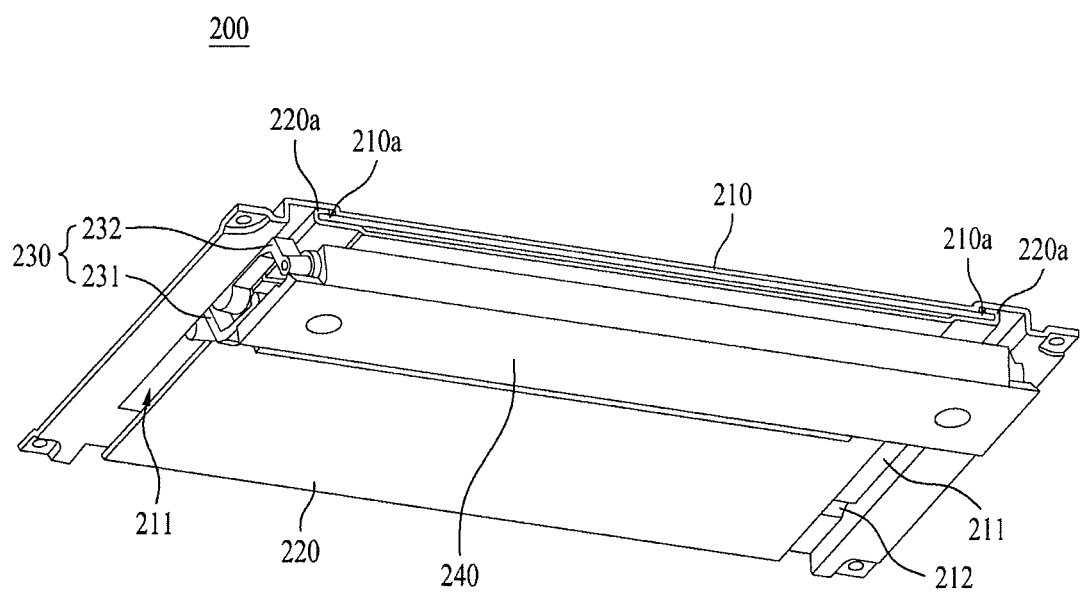

FIG. 4 is a perspective diagram for closed and open configurations of a mobile terminal according to one embodiment of the present invention, FIG. 5 is an exploded perspective diagram of a slide hinge module of a mobile terminal according to one embodiment of the present invention, FIG. 6 is a diagram of a fixing part shown in FIG. 5, FIG. 7 is a diagram of a sliding part shown in FIG. 5, and FIG. 8 and FIG. 9 are perspective diagrams of assembled configuration members shown in FIG. 5, respectively.

Referring to FIG. 4(a), if the first body 101 is arranged in a manner of being superposed on the second body 102, referred to as a closed configuration. Referring to FIG. 4(b), if the second body 102 slides to expose at least one portion of the first body 101, referred to as an open configuration.

A mobile terminal according to one embodiment of the present invention includes a first body 101, a second body 102 loaded on the first body 101 to be slidable thereon, and a slide hinge module 200 configured to guide a slidable movement of the second body 102 on the first body 101 to open the first body 101, the slide hinge module 200 configured to guide a rotary motion of the second body 102 against the first body 101 in case of an open configuration of a partial region of the first body 101.

Referring to FIG. 4 and FIG. 5, the slide hinge module 200 can include a fixing part 210 provided within the second body 102, a slide part 220 configured to slidably move along the fixing part 210, and a pair of hinge arms 230 having first and second end portions 231a/232a and 231b/232b respectively provided within the first body 101. In this case, the first end portions 231a and 232a are rotatably provided to the slide part 220, while the second end portions 231b and 232b are rotatably provided within the first body 101.

A pair of the hinge arms 230 can include a first hinge arm 231 configured to provide a turning force to the fixing part 210 and a second hinge arm 232 configured to guide a rotary movement of the fixing part 210.

Referring to FIGS. 5 to 7, the fixing part 210 is provided within the second body 102 in a manner of being fixed thereto. The fixing part 210 moves together with the second body 102 if the second body 102 is sliding to move. The fixing part 210 can be configured as a plate. And, a projected portion 210a can be provided to each of both lateral end portions of the fixing part 210 along a slide direction to guide a slide movement of the slide part 220.

The slide part 220 can be configured as a plate as well. And, both lateral end portions 220a of the slide part 220 can enclose the projections 210a provided to both lateral end portions of the fixing part 210, respectively. Moreover, support members 221 can be provided to both lateral side end portions of the slide part 220 to have the first end portions 231a and 232a of the first and second hinge arms 231 and 232 loaded rotatably thereon, respectively. In this case, locking holes 221a and 221b can be provided to the support members 221 to be locked with hinge shafts (not shown in the drawings) of the first and second end portions 231a and 232a of the first and second hinge arms, respectively.

Referring to FIG. 6, when the second body 102 slides to move, in order to pressurize the first end portions 231a and 232a of the first and second hinge arms 231 and 232 toward the first body 101, a guide grove 212 can be provided to the fixing part 210.

Referring to FIG. 5, a pair of the hinge arms 230 can be provided to both lateral end portions (i.e., support members) of the slide part 220 to oppose the lateral end portions of the fixing part 110, respectively. Therefore, the guide groove 212 can be provided to each of both lateral end portions of the fixing part 110.

How a pair of the hinge arms 230 are connected to each other is explained as follows. First of all, a frame 240 can be provided within the first body 101 to have the second end portions 231b and 232b of the first and second hinge arms 231 and 232 rotatably loaded therein. In this case, the frame 240 can include a base part configured to be substantially in parallel with a surface direction off the second body 102 and a loading part configured to extend from the base part in a vertical direction. Since a pair of the hinge arms 230 are loaded on both lateral end portions (i.e., support members) of the slide part 220, respectively, a pair of loading parts are provided in a manner of being spaced apart from each other by a prescribed space in-between.

Moreover, locking holes (not shown in the drawing) can be provided to lock the hinge shafts (not shown in the drawing) of the second end portions 231b and 232b of the first and second hinge arms 231 and 232, respectively.

The second end portion 232b of the second hinge arm 232 provided to each of the lateral end portions of the slide part 220 is connected to a connecting rod 233. In this case, the connecting rod 233 is rotatably provided to the loading part of the frame 240. And, an actuator 234 can be provided to the connecting rod 233 to provide a turning force to the second hinge arm.

Meanwhile, the first hinge arm 231 can be provided with an elastic member (not shown in the drawing) for applying the turning force to the hinge shaft provided to the second end portion 231b in a slidable moving direction of the second body 102. In this case, the elastic member can include a torsion spring.

Referring to FIG. 5 and FIG. 6, a pair of the hinge arms 230 are loaded on both of the lateral end portions (i.e., support members) of the slide part 220, respectively. When the slide part 200 slides, the first end portion 231a of the firs hinge art 231 slidably moves within the guide groove 210.

Therefore, the projection 210a provided to each of the lateral end portions of the fixing part 210 can be provided more inward than the guide groove 211.

Figure 10:
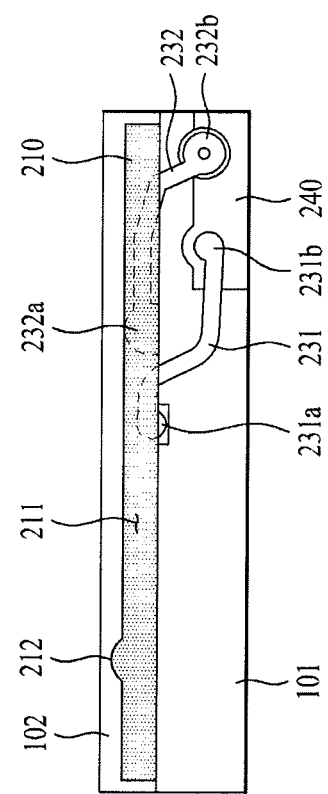
Figure 11:
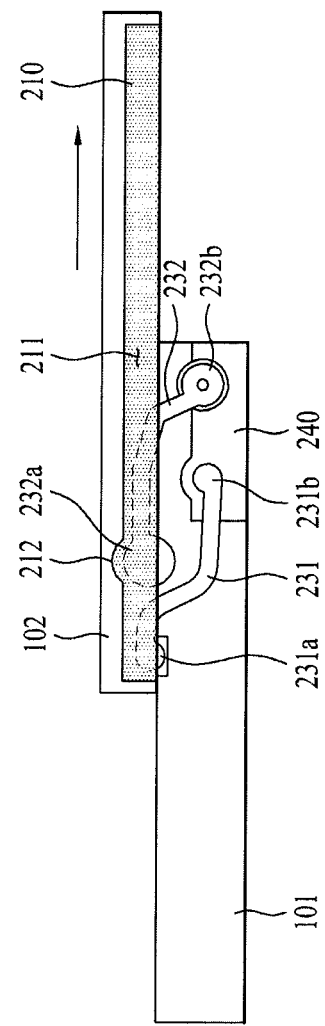
Figure 12:
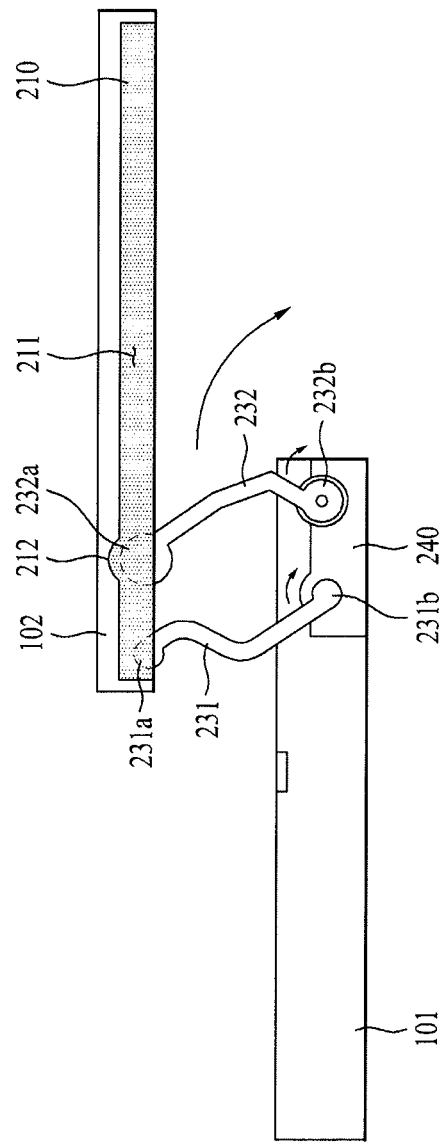
Figure 13:
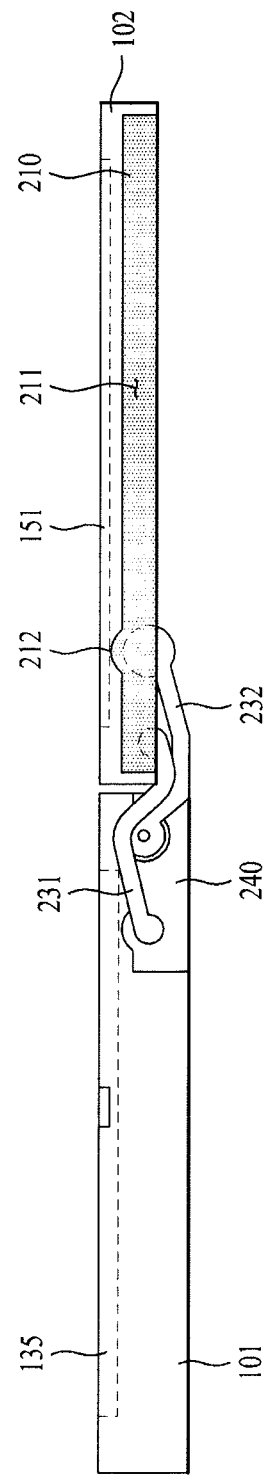
Figure 14:
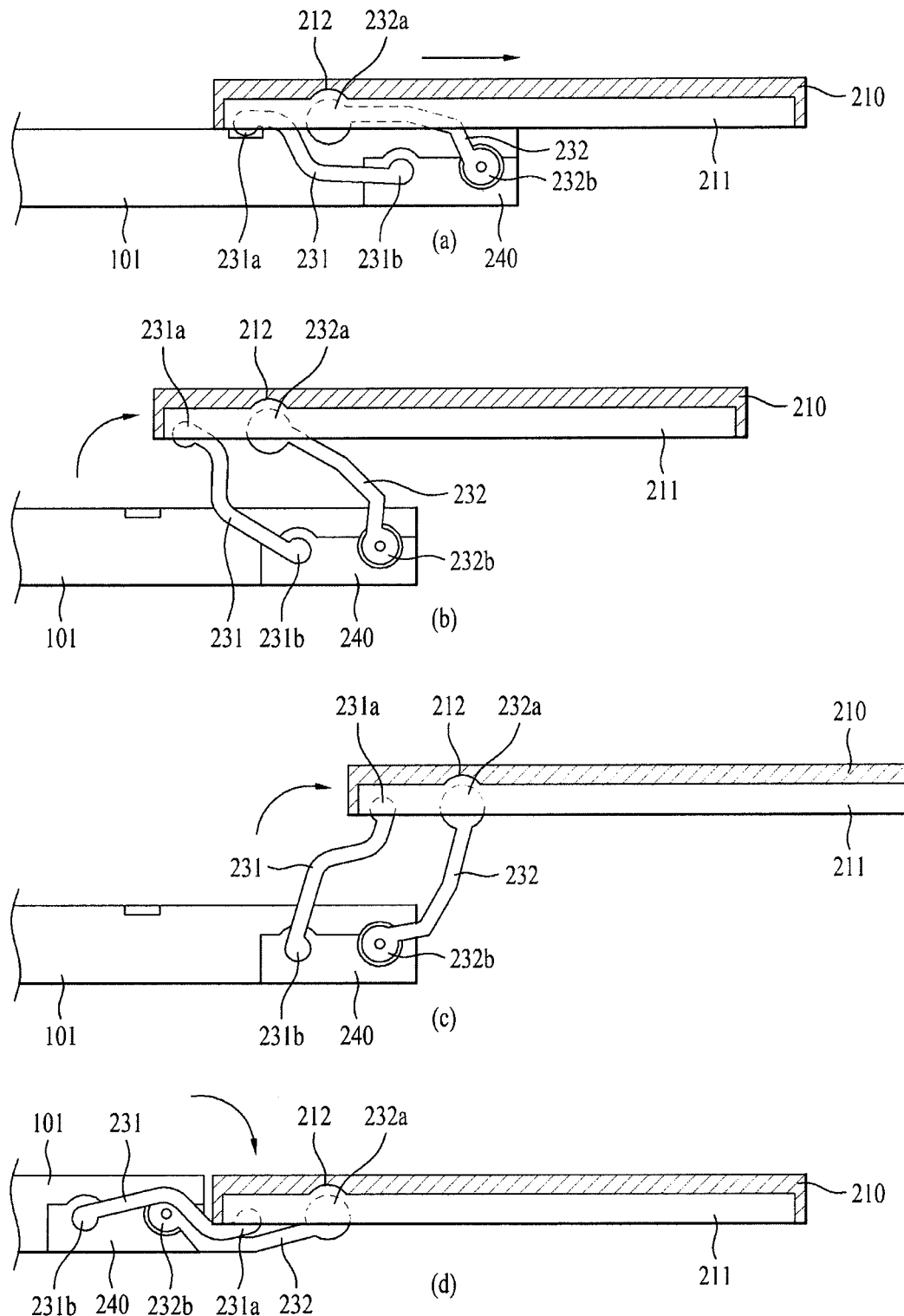

FIGS. 10 to 14 are diagrams for an open configuration of a mobile terminal according to one embodiment of the present invention. In particular, FIG. 10 shows a closed configuration, FIG. 11 shows a slide movement process, FIG. 12 shows a rotary movement process, and FIG. 13 shows an open configuration.

Moreover, FIG. 14(a) shows a state that a rotary movement starts after completion of a slide movement. FIG. 14(b) shows a rotary movement process. FIG. 14(c) shows a rotary movement process. FIG. 14(d) shows an open configuration that a rotary movement is completed.

Although a turning force is applied to the first hinge arm 231 and/or the second hinge arm 232 in a slide direction of the second body 102 by the elastic member or the actuator 234, since a pressurized state is maintained by the guide groove 211, a rotation of each of the hinge arms 231 and 232 is not performed in the slide movement process of the second body 102.

Meanwhile, in case that a partial region of the first body 101 is in the open configuration, a recess 212 can be provided to the guide groove to release a binding force from the first end portion 232a of the second hinge arm 232.

In this case, the recess 212 can be provided to a location at which the slide movement of the second body 102 is completed to open the first body 101. The recess 212 can be projected in a depth direction of the guide groove 211 from a bottom surface of the guide groove 211. And, the first end portion 232a of the second hinge arm 232 can be engaged with an inner circumference of the recess 212.

Therefore, although a turning force is applied to the first hinge arm 231 and/or the second hinge arm 232 in a slide direction of the second body 102 by the elastic member or the actuator 234, since a pressurized state is maintained by the guide groove 211, a rotation of each of the hinge arms 231 and 232 is not performed in the slide movement process of the second body 102. The first end portion 232a of the second hinge arm 232 is engaged with the recess 212 provided to a location at which the slide movement of the second body 102 is completed to open the first body 101. As the binding force is released, the rotary movement of the fixing part 210 is performed by the first hinge arm 231 and the second hinge arm 232.

The first display 135 externally exposed in the slide opening process is provided to the first body 101. The second display 151 externally exposed is provided to the second body 102. After the rotary movement of the second body 102 against the first body 101 has been completed, the first display 135 and the second display 151 are coplanar.

Referring to FIGS. 10 to 13, the first hinge arm 231 and the second hinge arm 232 can be bent in directions opposite to each other in the closed configuration of the first body 101.

On the contrary, a keypad (not shown in the drawing) externally exposed in a slide open process can be provided to the first body 101. The second display 151 externally exposed can be provided to the second body 102. After completion of the rotary movement of the second body 102 against the first body 101, the keypad and the second display 151 are coplanar.

A mobile terminal according to another embodiment of the present invention includes a main body 101 provided with the first display 135, a slide body 102 slidably provided to the main body 101 to externally expose the first display 135, the slide body 102 provided with the externally exposed second display 151, and a slide hinge module 200 configured to guide a slide movement of the slide body 102 to reduce an overlapped region between the main body 101 and the slide body 102, the slide hinge module 200 configured to guide a rotary movement of the slide body 102 to prevent the main body 101 and the slide body 102 from being overlapped with each other.

In the following description, an interoperating system between the first display 135 and the second display 151 is explained with reference to FIG. 15 and FIG. 16.

Figure 15:
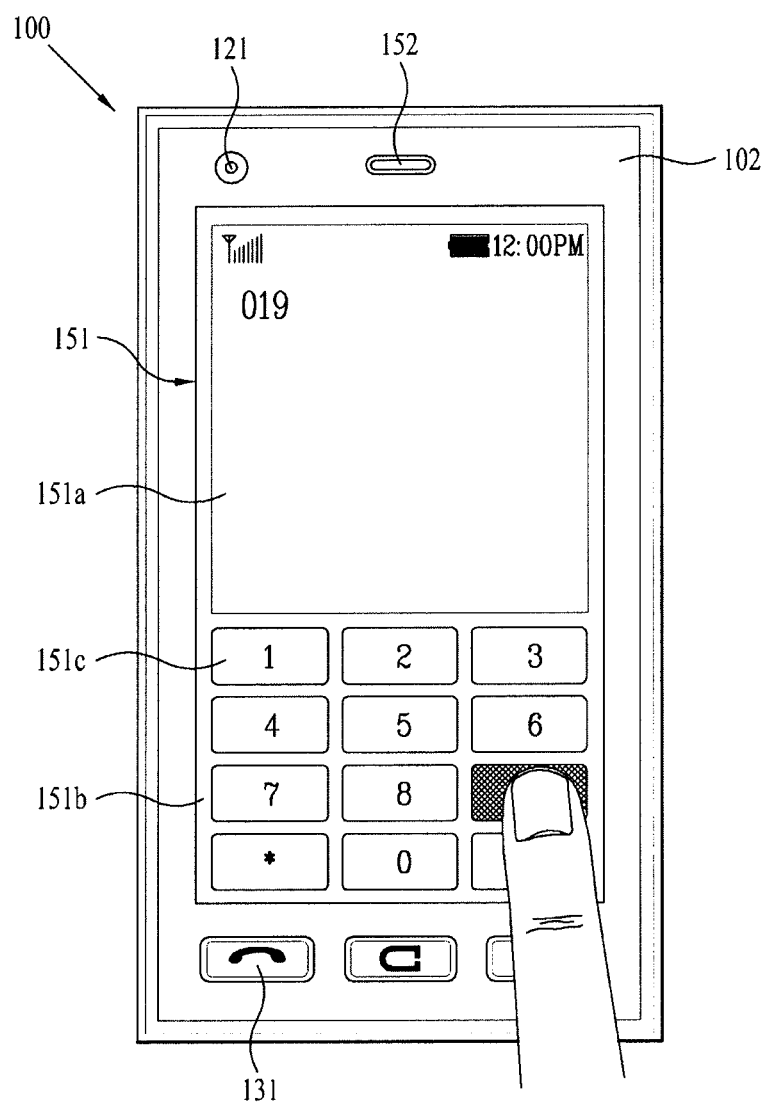
FIG. 15 and FIG. 16 are front diagrams of a mobile terminal according to one embodiment of the present invention for describing one operational status of the mobile terminal.
Figure 16:
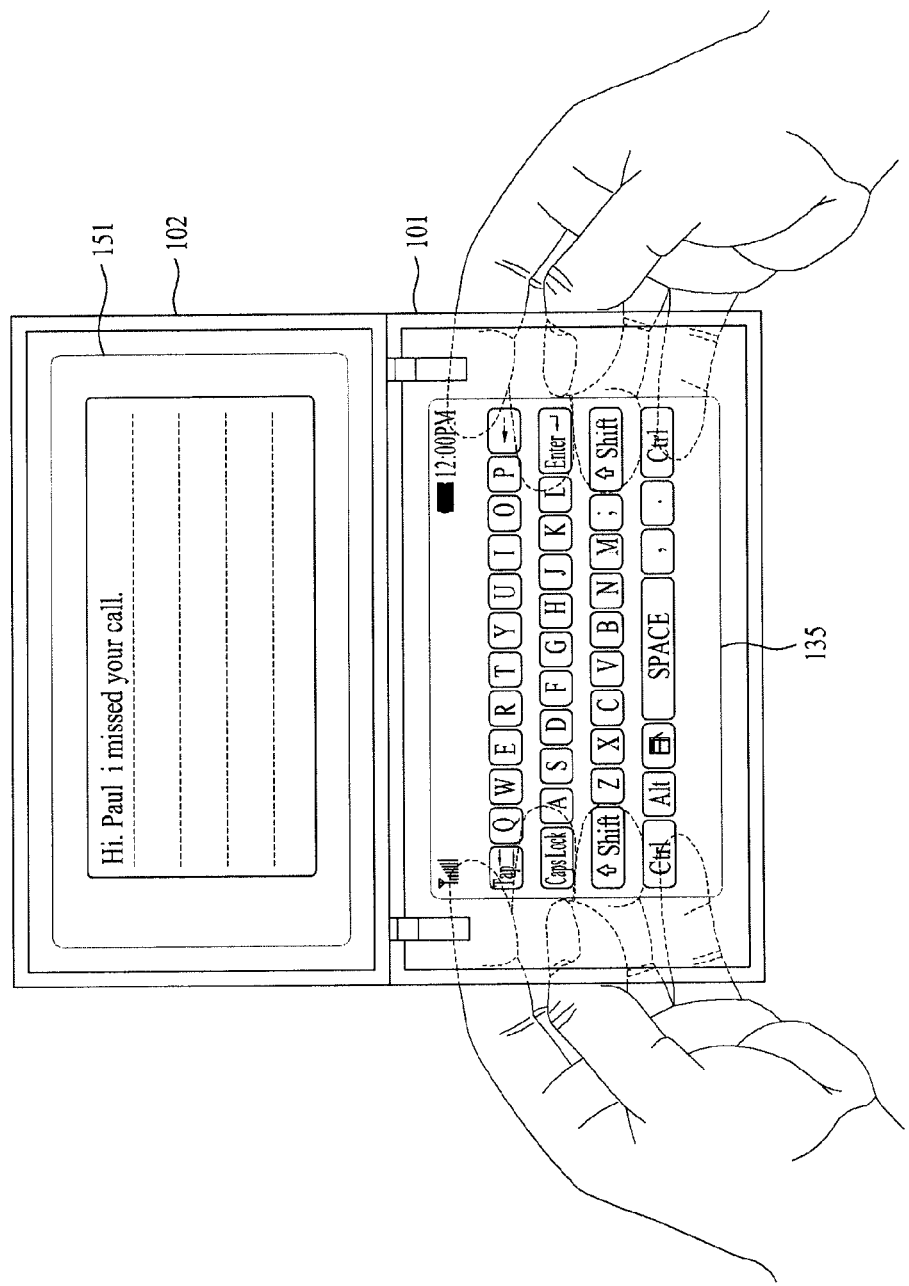

FIG. 15 and FIG. 16 are front diagrams of a mobile terminal according to one embodiment of the present invention for describing one operational status of the mobile terminal.

First of all, various kinds of visual information can be displayed on the second display 151 exposed externally in a closed configuration of the mobile terminal 100. And, this information can be displayed as at least one of characters, numerals, symbols, graphics, icons and the like.

To input this information, at least one of the characters, numerals, symbols, graphics, icons and the like are displayed in a predetermined formation to be implemented as a type of keypad. This keypad can be called 'soft keys'.

FIG. 15 shows that a touch applied to a soft key is inputted via a front side of the second body 102 of the mobile terminal 100.

The second display 151 is operable as a whole region or can operate by being divided into a plurality of regions. In the latter case, a plurality of the regions can be configured to work interoperably.

For instance, an output window 151a and an input window 151b are displayed on upper and lower parts of the second display unit 151, respectively. Soft keys 151c, on which numerals for inputting a phone number and the like are displayed, are outputted to the input window 151b. If the soft key 151c is touched, the number or the like corresponding to the touched soft key is displayed on the output window 151a. If the first manipulating unit 131 is manipulated, a call connection to the phone number displayed on the output window 151a is tried.

Although FIG. 15 shows a case that the first manipulating unit 131 is provided to an exterior of the second display 151, it is a mater of course that each manipulating unit can be displayed via the input window 151b of the second display 151.

FIG. 15 shows that a touch applied to a soft key is received via a backside of the terminal body. If FIG. 15 shows a case that the terminal body is vertically arranged (portrait), FIG. 16 shows a case that the terminal body is horizontally arranged (landscape). And, the first and second displays 135 and 151 can be configured to change an output picture according to the arranged direction of the terminal body.

FIG. 16 shows that a text input mode is entered in a mobile terminal. According to one embodiment, an output window can be displayed on the second display 151, while an input window is displayed on the first display 135. As mentioned in the foregoing description, a plurality of soft keys, on which at least one of characters, symbols, numerals and the like are displayed, can be arranged on the input window. In this case, the soft keys can be arranged in the QWERTY key formation.

If the soft keys are touched by a touch input to the first display 135, the characters, symbols and digits corresponding to the touched soft keys are outputted to the output window of the second display 151. Thus, as the input window and the output window are outputted via the first display 135 and the second display 151, respectively, it is able to increase a size of the soft keys. Therefore, more correct touch inputs are possible.

In addition to the input systems disclosed in the above embodiments, the second display 151 or the first display 135 can be configured to receive a touch input by scroll. A user scrolls the first display 135 or the second display 151 to shift a cursor or pointer located at an entity (e.g., icon or the like) displayed on each of the displays 135 and 151. Furthermore, in case that a finger is shifted on the first display 135 or the second display 151, a path of the shifted finger can be visually displayed on the corresponding display 135 or 151. This may be useful in editing an image displayed on the displays 135 and 151.

To cope with a case that both of the first and second displays 135 and 151 are touched together within a predetermined time range, one function of the terminal can be executed. The above case of the simultaneous touch may correspond to a case that the first and second bodies 101 and 102 are clamped by a user using both hands.

Moreover, it is able to smoothly perform multitasking via the first and second displays 135 and 151. And, it is also able to provide various user interface environments via the first and second displays 135 and 151 in case of driving a game or a multimedia application.

As mentioned in the foregoing description, in the above-configured mobile terminal according to at least one embodiment of the present invention, when the mobile terminal has a dual display of a slide type, after a slide movement and a rotary movement have been performed in order, if an open configuration is entered, both displays are located on the same plane and various user interface environments can be provided.

Moreover, in the above-configured mobile terminal according to at least one embodiment of the present invention, a main body or a first body can be maintained in 100% of an open configuration. After a slide movement has been completed, a rotary movement can be automatically performed.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A mobile terminal comprising:
a first body;
a second body slidably connected to the first body; and
a slide hinge module configured to:
guide a slidable movement of the second body on the first body to expose the first body; and guide a rotary movement of the second body against the first body after the slidable movement is completed,
wherein the slide hinge module comprises:
a fixing part provided within the second body;
a slide part configured to slide along the fixing part; and
a pair of hinge arms having a first end portion rotatably connected to the slide part and a second end portion rotatably connected to the first body.

2. The mobile terminal of claim 1, wherein the pair of hinge arms comprises a first hinge arm configured to provide a turning force to the fixing part and a second hinge arm configured to guide a rotary movement of the fixing part.

3. The mobile terminal of claim 2, wherein the first hinge arm is provided with an elastic member to apply the turning force to a hinge shaft provided to the second end portion.

4. The mobile terminal of claim 3, wherein the elastic member comprises a torsion spring.

5. The mobile terminal of claim 2, wherein the fixing part is provided with a guide groove for guiding a slide movement of the second body in a manner of pressurizing the first end portion of each of the hinge arms toward the first body.

6. The mobile terminal of claim 5, wherein the guide groove is provided with a recess configured to engage the first end portion of the second hinge arm.

7. The mobile terminal of claim 6, wherein the recess is provided to a location at which the slide movement of the second body is completed.

8. The mobile terminal of claim 6, wherein the recess is formed in a bottom surface of the guide groove.

9. The mobile terminal of claim 6, wherein the first end portion of the second hinge arm is engaged with an inner circumference of the recess.

10. The mobile terminal of claim 2, wherein the first hinge arm and the second hinge arm are bent in directions opposite to each other of the first body.

11. The mobile terminal of claim 1, wherein lateral end portions of the fixing part are enclosed by lateral end portions of the slide part, and
wherein the pair of hinge arms are connected to each lateral end portion of the slide part to correspond to each lateral end portion of the fixing part, respectively.

12. The mobile terminal of claim 11, further comprising a connecting rod connected to a second end portion of a second hinge arm, among the pair of hinge arms, and
wherein an actuator configured to provide the turning force to the second hinge arm is loaded on the connecting rod.

13. The mobile terminal of claim 1, wherein a first display is provided to the first body to be exposed when the second body is slid relative to the first body,
wherein a second display is provided to the second body to be externally exposed, and
wherein after a rotary movement of the second body has been completed against the first body, the first display and the second display are coplanar.

14. The mobile terminal of claim 1, wherein a keypad is provided to the first body to be externally exposed when the second body is slid relative to the first body,
wherein a display is provided to the second body to be externally exposed, and
wherein after a rotary movement of the second body has been completed against the first body, the keypad and the display are coplanar.

15. A mobile comprising:
a main body provided with a first display;
a slide body slidably provided to the main body to expose the first display, the slide body provided with an second display; and
a slide hinge module configured to guide a slide movement of the slide body to reduce an amount of overlap between the main body and the slide body, the slide hinge module configured to guide a rotary movement of the slide body to prevent the main body and the slide body from being overlapped with each other;
wherein the slide hinge module comprises:
a fixing part provided within the slide body;
a slide part to slide along the fixing part; and
a pair of hinge arms having a first end portion rotatably provided to the slide part and a second end portion rotatably provided within the main body.

16. The mobile terminal of claim 15, wherein the rotary movement of the second slide body starts after the slide movement of the second slide body has been completed.

17. The mobile terminal of claim 16, wherein the first display and the second display are coplanar after the rotary movement of the second slide body has been completed.

18. The mobile terminal of claim 15, wherein a pair of the hinge arms comprise a first hinge arm configured to provide a turning force to the fixing part and a second hinge arm configured to guide a rotary movement of the fixing part.

* * * * *